G. C. CLAUSEN.
Toe-Weight for Horses.
No. 212,440.    Patented Feb. 18, 1879.
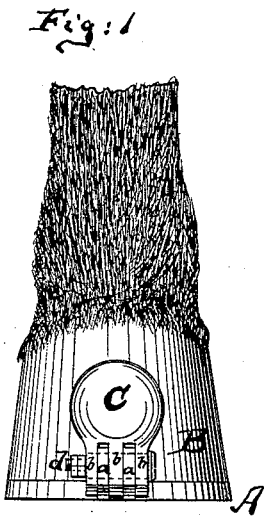
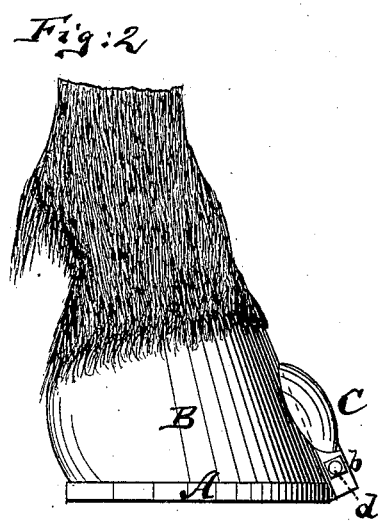
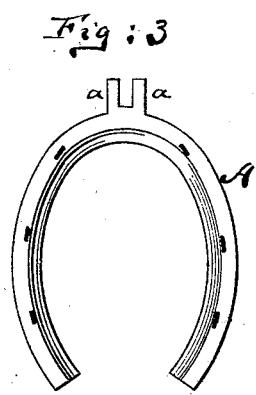
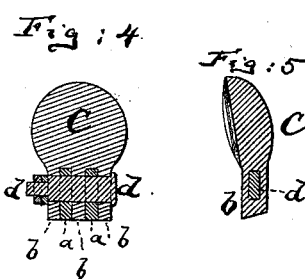
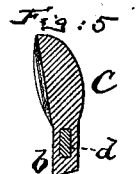
Witnesses:
John C. Funbridge
T. B. Mosher
Inventor:
George C. Clausen
by his attorney
A. v. Briesen

UNITED STATES PATENT OFFICE.

GEORGE C. CLAUSEN, OF NEW YORK, N. Y.

IMPROVEMENT IN TOE-WEIGHTS FOR HORSES.

Specification forming part of Letters Patent No. 212,440, dated February 18, 1879; application filed January 11, 1879.

*To all whom it may concern:*

Be it known that I, GEORGE C. CLAUSEN, of the city, county, and State of New York, have invented a new and Improved Toe-Weight for Horses, of which the following is a specification:

Figure 1 is a front view of a horseshoe and hoof provided with my improved toe-weight. Fig. 2 is a side view of the same. Fig. 3 is a detail bottom view of the horseshoe alone. Fig. 4 is a longitudinal vertical section, and Fig. 5 a vertical cross-section of the toe-weight.

Similar letters of reference indicate corresponding parts in all the figures.

This invention relates to a new arrangement of toe-weight for use on horses' hoofs, and has for its object to produce a means of fastening the toe-weight directly to the horseshoe.

By my construction I dispense with the fastening devices heretofore used, and at the same time prevent the weight from working loose while the horse is trotting. The toe-weight can, nevertheless, be readily taken off and replaced.

The invention consists in providing the toe-weight with one or more downwardly-projecting lugs, and the horseshoe in front with upwardly-projecting lugs, that enter between the projections of the toe-weight, and in passing a horizontal bolt through all of said projections or lugs, as hereinafter more fully specified.

In the accompanying drawing, the letter A represents the horseshoe; B, the hoof; C, the toe-weight. The horseshoe has at its front two (more or less) upwardly-projecting lugs, $a\ a$, which enter and fit between lugs $b\ b$, that extend downwardly from the toe-weight. The latter rests on the lugs $a$, or shoe, and is also prevented from lateral displacement by the lugs $a$. A bolt, $d$, passing through all the lugs $a$ and $b$, and having a head at one end and a nut or nuts at the other, serves to secure the toe-weight to the horseshoe. The bolt should be rectangular in cross-section where it passes through the lugs, or feathered, so as to prevent the toe-weight from revolving on it. The bolt may be made secure by other means than the nuts.

It will be seen that by this arrangement the toe-weight is rigidly secured in place, readily removable, easily repaired, and that at the same time it is fastened to the horseshoe directly, and without any intermediate fastening devices.

I claim—

The combination of the toe-weight C, having lugs $b$, with the horseshoe A, having lugs $a$, and with the bolt $d$, that passes laterally through all of said lugs, all arranged so that the lugs of the toe-weight fit between those on the horseshoe, or vice versa, and so that the toe-weight is fastened to the horseshoe directly, and without any intermediate fastening device, substantially as specified.

GEORGE C. CLAUSEN.

Witnesses:
F. V. BRIESEN,
T. B. MOSHER.